United States Patent
Brischke et al.

(10) Patent No.: US 7,409,559 B2
(45) Date of Patent: Aug. 5, 2008

(54) SYSTEM AND METHOD OF EXCHANGING INFORMATION VIA ELECTRONIC MAIL

(75) Inventors: Harold Allan Brischke, San Antonio, TX (US); Dwayne LaMarr Bess, San Antonio, TX (US); Robert Wilson Barner, San Antonio, TX (US); Michael Craig Nickel, Boerne, TX (US); Jeffrey William Gallagher, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 764 days.

(21) Appl. No.: 10/739,539

(22) Filed: Dec. 18, 2003

(65) Prior Publication Data

US 2004/0133810 A1 Jul. 8, 2004

Related U.S. Application Data

(60) Provisional application No. 60/436,170, filed on Dec. 23, 2002.

(51) Int. Cl.
*G06F 21/00* (2006.01)

(52) U.S. Cl. .................. 713/182; 713/168; 713/170

(58) Field of Classification Search .................. 713/182, 713/168, 170
See application file for complete search history.

(56) References Cited

U.S. PATENT DOCUMENTS

| | | | | |
|---|---|---|---|---|
| 6,449,634 | B1 * | 9/2002 | Capiel | 709/206 |
| 6,704,772 | B1 * | 3/2004 | Ahmed et al. | 709/207 |
| 6,725,269 | B1 * | 4/2004 | Megiddo | 709/228 |

* cited by examiner

*Primary Examiner*—Thomas Peeso
(74) *Attorney, Agent, or Firm*—Woodcock Washburn LLP

(57) ABSTRACT

The present invention provides an electronic communication system and method for conducting business transactions. The present invention requires a customer to access a proprietary e-mail application residing behind one or more firewalls to enable one to one communication with a customer service representative. The electronic mail system of the present invention is equipped with workflow component(s), mainframe system tie-ins, human resource system(s) capable of accessing CRM information, and archiving/storage capabilities to ensure accurate records of all electronic communication. The system further utilizes a series of attractive graphic interfaces to ensure that both the organization and the customer are provided with the requisite information for transacting business via electronic mail.

22 Claims, 14 Drawing Sheets

```
New Conversation
Jump to: Conversation Setup                                    Member Name  Member Number
        Compose Message                                        John Q. Public  559 04 45
        Conversation History
Conversation Setup                                                              to top ▲
```

| | |
|---|---|
| Subject: | [_____] |
| Company: | -Select- ▽ |
| Date of Loss: | [_____] □□ MM/DD/YYYY |
| [Contract/loss/Account]#: | [_____] [(Optional)] |

Compose Message                                                                to top ▲

| | |
|---|---|
| Send notifications to: | jqpublic@yahoo.com ▽ -OR- Other: [_____] |
| | This is where the member will receive an email notifying them that there is a message waiting for them at www.bank.com |
| Body: | [Salutation]  50B <br> Insert body of message here |
| Reply Expected? | ○ Yes  ○ No                                50C |
| Inactive in: | [ 10 ] days (min 0, max 14) |
| Closing Statement: | If Yes: Please reply to this message within [X] days from the data received or this conversation will automatically close. Once a coversation is closed one cannot reply to it. However, it will still be available for viewing for 30 days. If you have received this message and were unable to... |
| Signature: | [Sincerely,], [HR Name], [HR Title], [Company ID], [HR Phone #] |
| Links to bank.com: 50L | Auto Life Event main menu <br> Retirement Calculator <br> Insurance main menu <br> SSA Information <br> Billing Information <br> Initial Loss Report <br> Auto Quote Interactive <br> Auto ID Card request <br> Life Level Term Quote <br> Select more than one option by using Ctrl + click |
| BANK Forms: 50F | Claims 1 <br> Claims 2 <br> Claims 3 <br> Select more than one option by using Ctrl + click |

50

[Cancel] [Delete] [Spell Check] [Preview] [Save Draft] [Send]

Links to ussa.com: 50L
-------General-------
Auto Life Event main Menu
Retirement Calculator
Turbo Tax for the Web
-------Insurance-------
Insurance main menu
SSA Information
Select more than one option by using Ctrl + click

|   | ☐▽ | Status | Subject | Date Received | Days to Respond |
|---|---|---|---|---|---|
|   | ✉ | Unread | 07/30/02 Accident | 08/15/02 11:12 AM CT | 5 |
|   | ✉ | Unread | Homeowner Policy 90 A Duplicate | 01/07/02 1:47 PM CT | 4 |
| 0 | ⌂ | Reply Needed | Policy 0888 Update | 01/05/02 9:56 PM CT | 3 |
| 0 | ✉ | Reply Sent | Thanks for Using Electronic Documents | 11/06/01 10:33 AM CT |   |
|   | ▱ | Closed Purges 09/12/02 | Homeowner Policy 90A | 09/12/01 7:17 AM CT |   |

Your Messages

Below are your current conversations. To view the latest message in the conversation and reply, click on the conversation subject. If you have questions about the bank's electronic messages, please see About Your Messages.

BANK | Home | Insurance | Banking | Investments | Member Services

Accounts | Documents | Messages | Help | Log Off

To Bottom ▽ — 34

Contact us | Home

To Top △

Copyright © 1997 - 2002, bank. All Rights Reserved.

FIG. 4

BANK

Accounts | Documents | Messages | Help | Log Off

[Home] [Insurance] [Banking] [Investments] [Member Services]

To Bottom ▽

Subject: 07/30/01 Accident
View Message

> From: bank    Date/Time 06/05/2001  12:01:22 CT
> Dear Dr. John Q. Public
> Loram ipsum dolor sit amet. sdflks sldks  weci  weri  sndfoiwer wnsdlkfw  slkdfw wneoeiff nwiw wwoierieie sndfoiwer wnsdlkfw  slkdfw wneoeiff nwiw wwoierieiemfw .
> Loram ipsum dolor sit amet. sdflks sldks  weci  weri  sndfoiwer wnsdlkfw  slkdfw wneoeiff nwiw wwoierieie sndfoiwer wnsdlkfw  slkdfw wneoeiff nwiw wwoierieiemfw .
> [Sincerely,]
> [CSR Name]
> [CSR Title]
> [Contact Information]
> Message delivery notification sent to <email address>
>
> | www.bank.com links |
> | Insurance Main Menu |
> | Your Insurance Account |
> | Auto Quote Interactive |
> | View Your Policy |
> | Fast Auto Quote |
>
> [Previous] [Reply] —54

Message History

> ☐ From: John Q. Public    Date/Time: 06/05/2001  12:01:22 CT
> Loram ipsum dolor sit amet. sdflks sldks  weci  weri  sndfoiwer wnsdlkfw  slkdfw wneoeiff nwiw wwoierieie sndfoiwer wnsdlkfw  slkdfw wneoeiff nwiw wwoierieiemfw .
> Loram ipsum dolor sit amet. sdflks sldks  weci  weri  sndfoiwer wnsdlkfw  slkdfw wneoeiff nwiw wwoierieie sndfoiwer wnsdlkfw  slkdfw wneoeiff nwiw wwoierieiemfw .
> Sincerely
> John Q. Public                              —55

☐ From: bank    Date/Time: 06/05/2001  12:01:22 CT

☐ From: John Q. Public    Date/Time: 06/05/2001  12:01:22 CT

☐ From: bank    Date/Time: 06/05/2001  12:01:22 CT

[Contact us] [Home]

To Top △

Copyright © 1997 - 2002, bank. All Rights Reserved.

*FIG. 5*    ↳52

| Messages | My Mailbox | | | | | | | |
|---|---|---|---|---|---|---|---|---|
| -My Mailbox | -Take Action- GO | | sdfi slsdkfs sldkfd slkdfs sdloxc | | —66 | | | |
| Member Activity | ☐ 0 ☐ ▽ | Status | Date | Subject | Control # | Member # | SDLFKJ | JKDSAL |
| Bank#: [ ] | ☐ 0 ✉ | UPDATED | 08/15/02 11:12 AM CT | 07/30/02 Accident | 07101 | 1234567 | - | - |
| ○ Start a New Conversation | ☐ ✉ | IN DRAFT | 01/07/02 1:47 PM CT | MasterCard Charge Dispute | 0983 2348 4283 | 2345678 | - | - |
| ○ View Member Index | ☐ ☐ | INITIATE_PENDING IN REVIEW | 01/05/02 9:56 PM CT | Policy 0888 Update | 23465 | 2345678 | - | - |
| [ GO ] | ☐ ✉ | UPDATED | 11/06/01 10:33 AM CT | Homeowner Policy 90A Duplicate | 90A | 3456789 | - | - |
| Enter links above (ON RADIO BUTTONS) are for model only||| | ☐ ✉ | SENT | 09/12/01 7:17 AM CT | Need VIN for 98 Honda Accord | 90A | 4567890 | - 66A - | |
| | ☐ 0 ✉ | PLEASE REPLY | 08/15/02 11:12 AM CT | Policy 0888 Update | 0874 | 5678901 | - | - |
| | ☐ ✉ | IN DRAFT | 01/07/02 1:47 PM CT | Problems with Premium Pay | 75897469 | 6789012 | - | - |
| | ☐ ✉ | INITIATE PENDING- HELD FOR REVIEW | 01/05/02 9:56 PM CT | Homeowner Policy 90A | 90A | 6789012 | 54321 | - |
| | ☐ ↗ | RETURNED | 11/06/01 10:33 AM CT | Homeowner Policy 90A Duplicate | 90A | 7890123 | - 66I - | |
| | ☐ 0 ✉ | SENT | 09/12/01 7:17 AM CT | Policy 0921 Update | 0921 | 8901234 | - | 01/08/01 |
| | ☐ ✉ | PLEASE REPLY | 08/15/02 11:12 AM CT | Problem with Web Billpay | 86369075 | 9012345 | - | - |
| | ☐ 0 ✉ | HELD FOR REVIEW | 01/07/02 1:47 PM CT | Renters Policy 100B | 100B | 0123456 | 34512 | - |
| | ☐ 0 ✉ | IN REVIEW | 01/05/02 9:56 PM CT | Electronic Signature | 1234 | 0123456 | - | - |
| | ☐ ↗ | RETURNED | 11/06/01 10:33 AM CT | Follow-Up on Fast Auto Quote | - | 1234567 | - | - |
| | ☐ 📦 | CLOSED PURGES 09/12/02 | 09/12/01 7:17 AM CT | Life Insurance Policy Inquiry | 76167 | 2345678 | - | - |
| | Check All | Uncheck All | | | | | | |

```
☐ Reason     Microsoft Internet Explorer  ☐▭✕
Reassign:
To: ☐
    Employee ID #

When: ○ Now
      ○ Later
            From: [___▼] [__] [____] 🗓
                  Month  DD  YYYY
            To:   [___▼] [__] [____] 🗓
                  Month  DD  YYYY ☐ Cancel Reassignment
                              [Cancel] [OK]
```

Reassign Confirmation

You are about to reassign communication(s)

monday 2/15
    Funding Subject
    monday 4/15 test
    My taxes are overdue
    Your payment is late
    Here it is
    MSR subject to '51000' - are you sure?   [Cancel] [OK]

| | | Status | Date | Subject | Member # | SDLFKJ | JKDSAL | JKDSAL | Inactive Date |
|---|---|---|---|---|---|---|---|---|---|
| ☐ 0 | ✉ | UPDATED | 08/15/02 11:12 AM CT | 07/30/02 Accident | 1234567 | 01234 | 54321 | - | - |
| ☐ | 🏠 | IN DRAFT | 01/07/02 1:47 PM CT | MasterCard Charge Dispute | 2345678 | 01234 | 54321 | - | - |
| ☐ | ☐ | INITIATE PENDING IN REVIEW | 01/05/02 9:56 PM CT | Policy 0888 Update | 2345678 | 01234 | 54321 | - | - |
| ☐ | ✉ | UPDATED | 11/06/01 10:33 AM CT | Homeowner Policy 90A Duplicate | 3456789 | 01234 | 54321 | - | - |
| ☐ | 🏠 | SENT | 09/12/01 7:17 AM CT | Need VIN for 98 Honda Accord | 4567890 | 01234 | 54321 | - | - |
| ☐ 0 | 🏠 | PLEASE REPLY | 08/15/02 11:12 AM CT | Policy 0888 Update | 5678901 | 01234 | 43215 | - | - |
| ☐ | 🏠 | IN DRAFT | 01/07/02 1:47 PM CT | Problems with Premium Pay | 6789012 | 01234 | 43215 | - | - |
| ☐ | 🏠 | INITIATE PENDING- HELD FOR REVIEW | 01/05/02 9:56 PM CT | Homeowner Policy 90A | 6789012 | 01234 | 43215 | 54321 | - |
| ☐ | 📤 | RETURNED | 11/06/01 10:33 AM CT | Homeowner Policy 90A Duplicate | 7890123 | 01234 | 43215 | - | - |
| ☐ 0 | 🏠 | SENT | 09/12/01 7:17 AM CT | Policy 0921 Update | 8901234 | 01234 | 43215 | - | 01/05/01 |
| ☐ | 🏠 | PLEASE REPLY | 08/15/02 11:12 AM CT | Problem with Web Billpay | 9012345 | 01234 | 32154 | - | - |
| ☐ 0 | 🏠 | HELD FOR REVIEW | 01/07/02 1:47 PM CT | Renters Policy 100B | 0123456 | 01234 | 32154 | 34512 | - |
| ☐ 0 | 🏠 | IN REVIEW | 01/05/02 9:56 PM CT | Electronic Signature | 0123456 | 01234 | 32154 | - | - |
| ☐ | 📤 | RETURNED | 11/06/01 10:33 AM CT | Follow-Up on Fast Auto Quote | 1234567 | 01234 | 32154 | - | - |
| ☐ | 📦 | CLOSED PURGES 09/12/02 | 09/12/01 7:17 AM CT | Life Insurance Policy Inquiry | 2345678 | 01234 | 32154 | - | - |

Check All | Uncheck All

FIG. 14

Set Defaults: Manager Settings — 96

Group: [Group Name ▼]   View: [Manager Settings ▼] [Go]

Links for modeling purposes only | Grove | More

Display Defaults

| Group | MSR # | Attachment Indicator | Status | Status Change Date | Subject | Member # | Inactive Date | Member Name | Loss/ Contract/ Account # | Purge Date | Conversation ID # | Reassignment Flag |
|---|---|---|---|---|---|---|---|---|---|---|---|---|
| ☑ | ☑ | ☑ | ☑ | ☑ | ☑ | ☑ | ☑ | ☐ | ☐ | ☐ | ☐ | ☑ |

Notification Timers

Manager

Open: [ ] (0-24 hrs)

Response: [ ] (0-24 hrs)

— 102

Signature Block

```
Sincerely,
[Name]
[Title]
[Group]
[Company]
Phone: [phone #]
```

[Default] [Reset]

[Cancel] [Save]

FIG. 15

Profile Management — 86

Group: [- Select - ▼] [Go]

MSR Profiles

Creat New MSR: [____] [Go]
Enter Employee #

| MSR Select Link to edit MSR Home Group | Employee # | Reassign Allowed | Takeover Allowed | Preview Required | Manager Review Required | Always Close Conversation Immediately | Use Customized Signature | Signature | Delete |
|---|---|---|---|---|---|---|---|---|---|
| [MSR Name] | [Employee #] | ☑ | ☐ | ☑ | ☐ | ☐ | ☐ | [View/ Change] | [Delete] |
| [MSR Name] | [Employee #] | ☑ | ☐ | ☑ | ☐ | ☐ | ☐ | [View/ Change] | [Delete] |
| [MSR Name] | [Employee #] | ☑ | ☐ | ☑ | ☐ | ☐ | ☐ | [View/ Change] | [Delete] |
| [MSR Name] | [Employee #] | ☑ | ☐ | ☑ | ☐ | ☐ | ☐ | [View/ Change] | [Delete] |
| [MSR Name] | [Employee #] | ☑ | ☐ | ☑ | ☐ | ☐ | ☐ | [View/ Change] | [Delete] |
| [MSR Name] | [Employee #] | ☑ | ☐ | ☑ | ☐ | ☐ | ☐ | [View/ Change] | [Delete] |
| [MSR Name] | [Employee #] | ☑ | ☐ | ☑ | ☐ | ☐ | ☐ | [View/ Change] | [Delete] |
| [MSR Name] | [Employee #] | ☑ | ☐ | ☑ | ☐ | ☐ | ☐ | [View/ Change] | [Delete] |
| [MSR Name] | [Employee #] | ☑ | ☐ | ☑ | ☐ | ☐ | ☐ | [View/ Change] | [Delete] |
| [MSR Name] | [Employee #] | ☑ | ☐ | ☑ | ☐ | ☐ | ☐ | [View/ Change] | [Delete] |

[Cancel] [Save]

— 98

Privileges — 86

Group: [Group Name ▼] [Go]

Share Privileges

| MSR | Employee # | Set Defaults | Profile Management | Group Overview | Reporting |
|---|---|---|---|---|---|
| [MSR Name] | [Employee #] | ☐ | ☐ | ☐ | ☐ |
| [MSR Name] | [Employee #] | ☐ | ☐ | ☐ | ☐ |
| [MSR Name] | [Employee #] | ☐ | ☐ | ☐ | ☐ |
| [MSR Name] | [Employee #] | ☐ | ☐ | ☐ | ☐ |
| [MSR Name] | [Employee #] | ☐ | ☐ | ☐ | ☐ |
| [MSR Name] | [Employee #] | ☐ | ☐ | ☐ | ☐ |
| [MSR Name] | [Employee #] | ☐ | ☐ | ☐ | ☐ |
| [MSR Name] | [Employee #] | ☐ | ☐ | ☐ | ☐ |
| [MSR Name] | [Employee #] | ☐ | ☐ | ☐ | ☐ |
| [MSR Name] | [Employee #] | ☐ | ☐ | ☐ | ☐ |

Transfer Privileges

Review: [- none - ▼]
Notification: [- none - ▼]

- none -
MSR Name - Emp #
MSR Name - Emp #
MSR Name - Emp #

[Cancel] [Save]

SYSTEM AND METHOD OF EXCHANGING INFORMATION VIA ELECTRONIC MAIL

This application claims priority upon a U.S. Provisional Application entitled "One to One Email," Ser. No. 60/436,170, having a filing date of Dec. 23, 2002.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

FIELD OF THE INVENTION

The present invention relates generally to electronic commerce and, more particularly, to a system and method of conducting business via electronic mail.

BACKGROUND OF THE INVENTION

In recent years, the availability of more efficient, reliable and cost-effective computers and networking tools has allowed many companies and individuals to become involved in an ever-growing electronic community. The immeasurable gains in technology experienced by the computer industry overall have allowed these users to rely on commercially available computers, such as personal computers, to meet their information processing and communication needs. To that end, PC manufacturers allow users to equip most PCs with an interface (such as a modem) that may be used for communication over networks, such as the Internet. The Internet is a well-known collection of networks (e.g., public and private voice, data, video and multimedia networks) that cooperate using common protocols to form a worldwide network.

Electronic mail and other forms of electronic exchange of information have become a common form of communication for individuals and entities, including businesses for internal as well as external correspondence. When using e-mail to communicate, a user will typically create a message using an e-mail program running on a computer that is or can be connected by a network to other computers. The message will include the e-mail address of the intended recipient. When the user has finished entering the message, the user will "send" the message to the intended recipient—the message is electronically transmitted via the computer network. The recipient, also using an e-mail program running on a computer connected to the computer network, can then read the received message.

A common computer network used to send and receive e-mail is the Internet. The Internet allows users to send and receive e-mail to and from computers around the world. Typically, each user will have an Internet e-mail address unique to that user, e.g., zarka@usaa.com. A user with an e-mail account and a computer that can connect to the Internet can easily send and receive e-mail over the Internet.

There are a number of ways that a user can connect to the Internet to send and receive e-mail. A user can have an account with a proprietary on-line network, such as, for example, Prodigy, America Online, CompuServe or Microsoft Network. Using a computer with a modem, the user dials up the on-line network's access number and connects to the on-line network. The user can then send and receive e-mail to and from other users of the on-line network and, provided that the on-line network is connected to the Internet, with those having an Internet e-mail address.

An alternative method to connect with the Internet is via an Internet Service Provider. Using a modem, the user dials the access number of the Internet Service Provider, and establishes a connection with a computer "directly" connected to or part of the Internet. The user can then operate an e-mail program, such as Eudora, to send and receive e-mail over the Internet.

Although email is a quick and convenient communication method, many users are hesitant to utilize email to transact business, the main concern being one of security, In short, there remains a need for a system and method capable of providing secure electronic communication for use in business transactions.

SUMMARY OF THE INVENTION

Accordingly, the present invention provides an electronic communication system and method for conducting business transactions. The present invention is equipped with multiple security tiers through which a customer must first pass before he or she may transact business through electronic mail. Unlike typical e-mail communication which is conducted over an unsecured ISP or unsecured line(s), the present invention requires the customer to access a proprietary e-mail application residing behind one or more firewalls. In one embodiment, such firewall(s) are owned and maintained by the organization with whom the customer wishes to conduct business via electronic mail.

In one embodiment, the proprietary e-mail system of the present invention is designed to provide controlled electronic communication for specific business matters as designated by the organization. In one embodiment, a customer service representative (CSR) of the organization initiates electronic communication by sending an e-mail to the customer's conventional e-mail address, i.e., zarka@aol.com, notifying the customer to access the organization's proprietary e-mail application through the organization's secure website address.

In one embodiment, the proprietary e-mail system of the present invention is equipped with workflow component(s), mainframe system tie-ins, human resource system(s) capable of accessing Customer relationship management (CRM) information, and archiving/storage capabilities to ensure accurate records are maintained for all electronic communication. The system further utilizes a series of attractive graphic interfaces to ensure that both the organization and the customer are provided with the requisite information for transacting business via electronic mail.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing; it being understood that the drawings contained herein are not necessarily drawn to scale; wherein:

FIG. 3 is a screen shot illustrating the CSR new message screen of one embodiment of the present invention.

FIGS. 4-6 are screen shots illustrating the customer interface of one embodiment of the present invention.

FIGS. 8-10 are screen shots illustrating the customer service representative interface of one embodiment of the present invention.

FIGS. 12-16 are screen shots illustrating the administrative interface of one embodiment of the present invention.

DETAILED DESCRIPTION OF THE INVENTION

Figure 1:
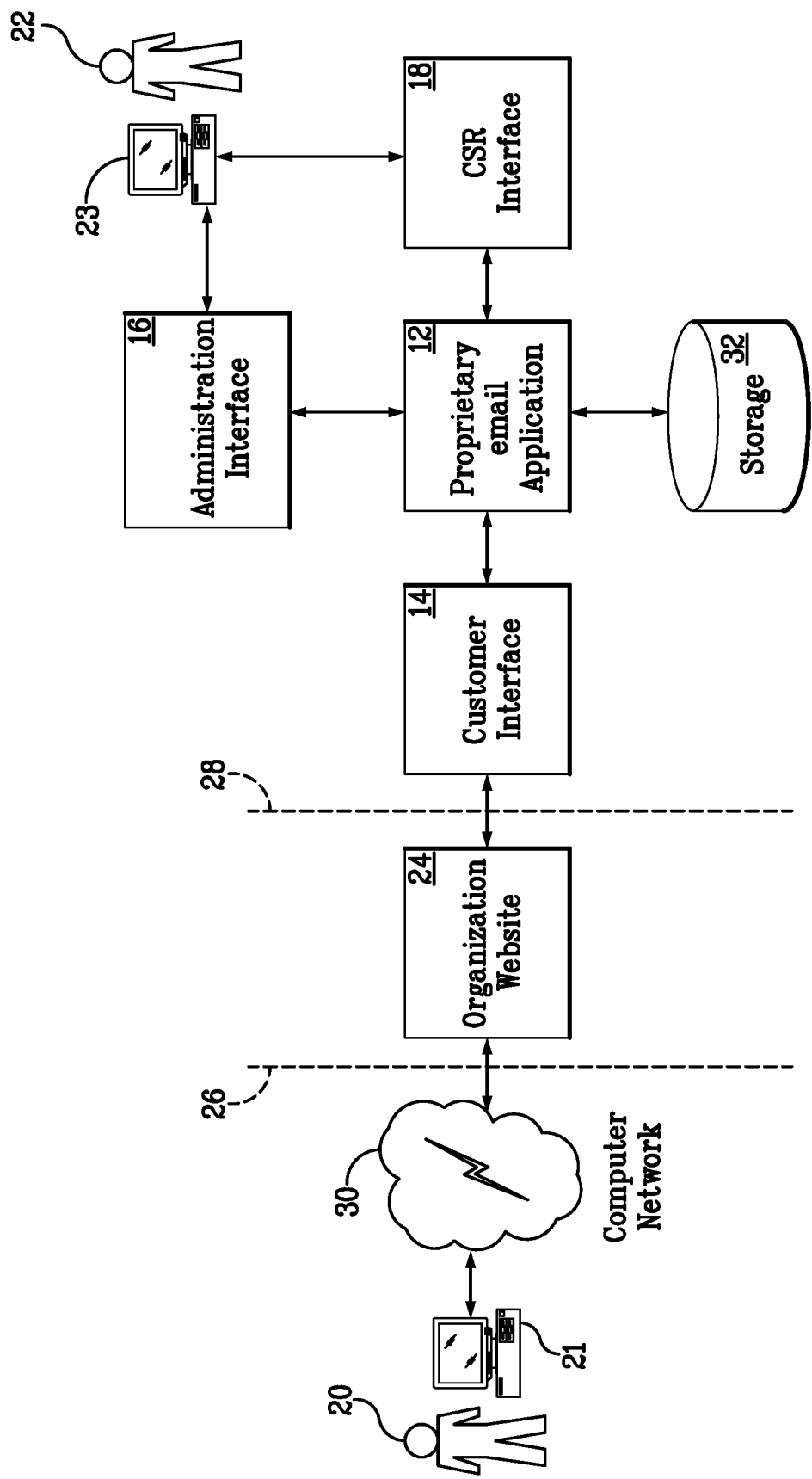
FIGS. 1 and 2 are process flow diagrams illustrating a high level view of the customer/CSR communication process of one embodiment of the present invention.

The present invention is herein described as a method of facilitating electronic communication and as a system for facilitating electronic communication. Referring to FIG. 1, the present invention provides a proprietary electronic mail application (12) having an electronic mail interface through which a remote user (20) may access and respond to one or more electronic communications. In one embodiment, the remote user may access the proprietary email application of the present invention through the use of a remote computer system (21) connected to a computer network (30). The proprietary email application works in conjunction with an interactive website (24) connected to a global computer network.

In one embodiment, the remote user must pass through a series of security thresholds prior to being provided with access to the email application of the present invention. In one embodiment, the remote user must enter an identification number prior to being granted access to the interactive website (24). Once the interactive website is displayed upon the remote user's browser, the remote user is prompted for a password and PIN number. Once verified, the remote user is allowed access to a customer interface (14) coupled to the email application of the present invention. The customer interface (14) provides an electronic mail inbox designed to facilitate communication between the remote user and a customer service representative.

Security infrastructure is utilized to provide security to the system against unauthorized access and/or harmful viruses. In one embodiment, a first firewall (26) is positioned between the interactive website and the computer network (30). Further, a second firewall (28) is positioned between the interactive website (24) and the email application of the present invention. The security configuration utilized by the present invention allows all electronic communication to take place behind multiple firewalls to ensure confidentiality. This feature of the present invention is especially important given the personal and confidential nature of many electronic communications.

Referring still to FIG. 1, the electronic mail application of the present invention further provides an administrative interface (16) and a customer service representative (CSR) interface (18). One or both of these interfaces (16 and 18, respectively) may be accessed by an employee (22) of the organization utilizing a computer system (23). In this manner, the present invention allows different functionality for each user of the electronic mail application of the present invention. Further, the electronic mail application may utilize one or more storage devices (32) to retrieve stored information and/or log transactional information.

The communication capability of the present invention is quite different from known electronic mail systems. For example, known electronic mail systems transmit electronic communications over an unsecured internet service provider or upon unsecured telephone lines. To illustrate, if customer A wishes to conduct business with company B via known electronic mail systems, such communication will proceed to and from company B and the internet service provider, i.e., AOL, Yahoo, etc. Customer A must then access the internet service provider's website in order to review and/or respond to the communication.

The use of known email systems is not desirable for transacting business due to security concerns and the inherent limitations of such systems. To illustrate, known systems are designed to allow communication between the email account holder and other individuals/entities having an email account. Thus, known email systems may view substantial electronic mail traffic as spam and, without doing any type of certification, may filter or delete electronic mail. In short, known systems are not designed to enable secure business transactions and may act as a hindrance to such transactions given these inherent limitations. In contrast, the proprietary email application of the present invention is designed to allow communication between a single customer and a CSR of an organization with whom the customer is doing business. As a result, the customer's email "account" is not subject to mass mailings or other intrusions.

Figure 2:
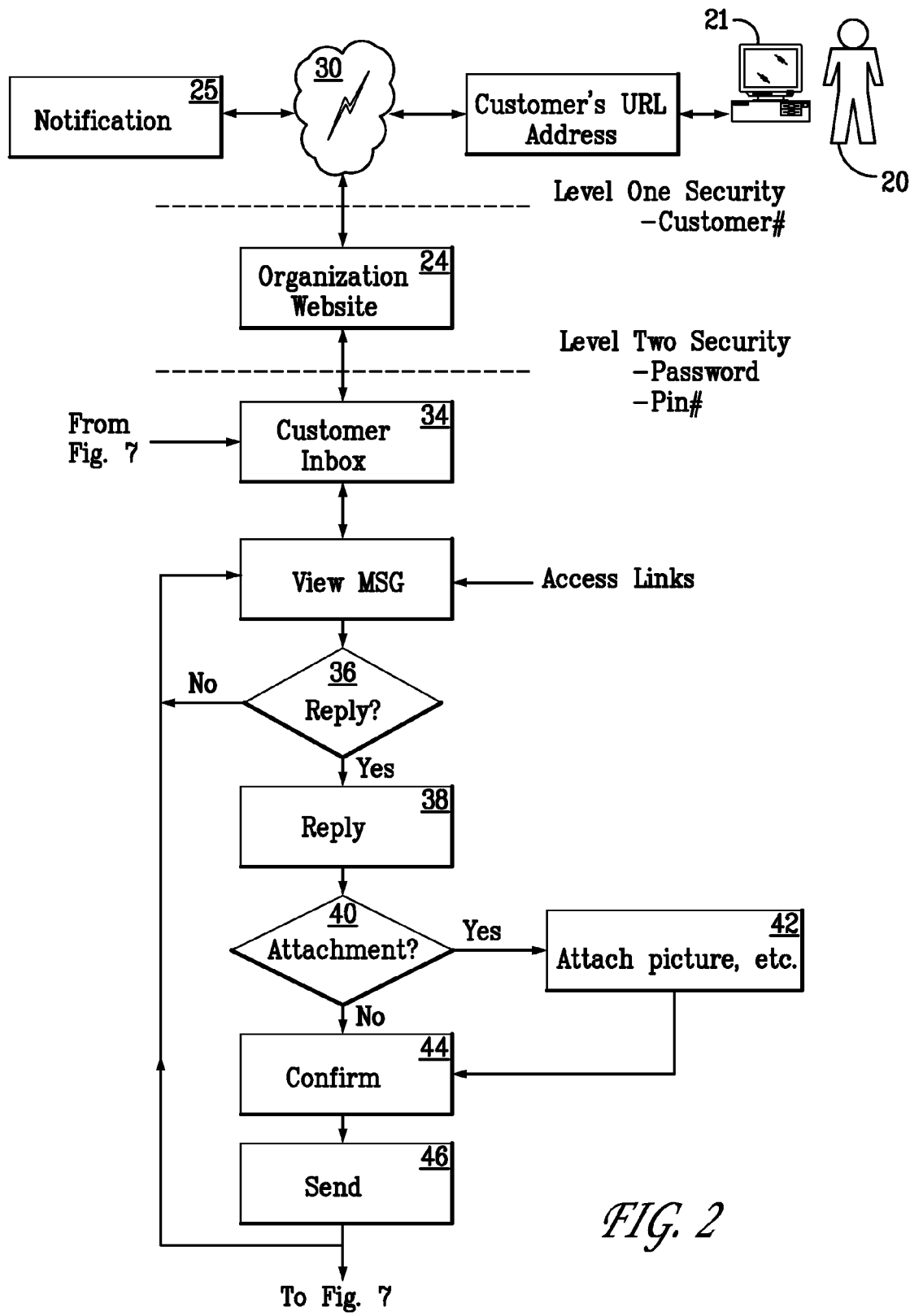

Referring to FIGS. 1-3, the CSR (22) initiates electronic communication with the customer for the purpose of dealing with a particular item of business. In one embodiment, a notification electronic mail is transmitted to the customer's conventional email address, as illustrated by Box (25). The notification email being designed to alert the customer (20) that a newly opened thread of electronic communication has been made available.

It should be noted that such notification may also be provided via a link or other notification upon the interactive website (24) without the need for the customer to review a conventional email inbox. This embodiment of the present invention is ideal for those customers who have internet access but do not have a conventional email account. In short, the present invention allows secure electronic communication between a CSR and a customer, regardless of whether the customer has a conventional email account.

As described below, the customer service representative may initiate electronic communication with a member through the CSR interface (18) of the present invention. In one embodiment, the CSR is provided with a series of attractive interface screens (48). FIG. 3 provides an example of the "new conversation" interface screen utilized by one embodiment of the present invention. The "new conversation" screen (50) provides a number of distinct sections designed to formalize each communication with the customer. In one embodiment, a body section (S50B) is provided for entry of the main portion of an electronic communication.

Further, a closing statement (50C) may be provided with each electronic communication to ensure that the customer does not procrastinate in replying to the electronic communication. Specifically, if a reply is expected from the customer, the customer service representative is prompted to enter a predetermined time period within which the customer must respond to the communication. Accordingly, a closing statement informing the customer that the electronic communication thread will close if a reply is not received within the predetermined time period may be provided with every communication. This feature of the present invention allows electronic communication to proceed in an efficient and organized manner.

In one embodiment, the "new conversation" screen also provides one or more predefined forms and/or links that may be utilized by the customer service representative. Such forms and/or links provide the customer with additional information and maybe provided as attachments to one or more electronic communications. In one embodiment, links and forms are provided via a scroll-down menu (50L and 50F, respectively) and may be line of business specific, as discussed further below.

Referring to FIGS. 2 and 4, the customer may access a customer inbox (34) provided by the electronic mail application of the present invention through a series of attractive customer interface screens (52). The customer inbox provides the customer with a host of information regarding each electronic communication. In one embodiment, the customer inbox provides detailed status information regarding each electronic communication and differentiates between active (52A) and inactive (52I) communication threads. In one embodiment, each electronic communication thread deals with a particular business transaction and is only "active" while the particular business transaction requires further action on the part of the CSR or the customer. For example, if the customer has been involved in an auto accident, the CSR would notify the customer that the organization has received an insurance claim, and that an electronic communication thread has been opened to initiate the insurance claim process via electronic communication. This would allow the CSR and the customer to correspond back and forth, i.e., one to one, so that the required forms, documentation, and/or evidence may be exchanged to expedite the insurance claim.

In the above example, once the insurance claim at issue has been finalized, the CSR will close the thread of electronic communication dealing with the closed insurance claim. In short, the electronic communication thread is terminated by the CSR such that the customer may no longer transmit email communication regarding that particular transaction. In one embodiment, a closed thread is indicated visually upon the customer inbox by graying out the particular thread at issue. In one embodiment, the member may download the text of the communication thread for their records, prior to the thread being purged from the customer's inbox (34). As discussed below, the present invention archives all of the information relating to the communication thread to be closed, such that a detailed record may be maintained.

Figure 6:
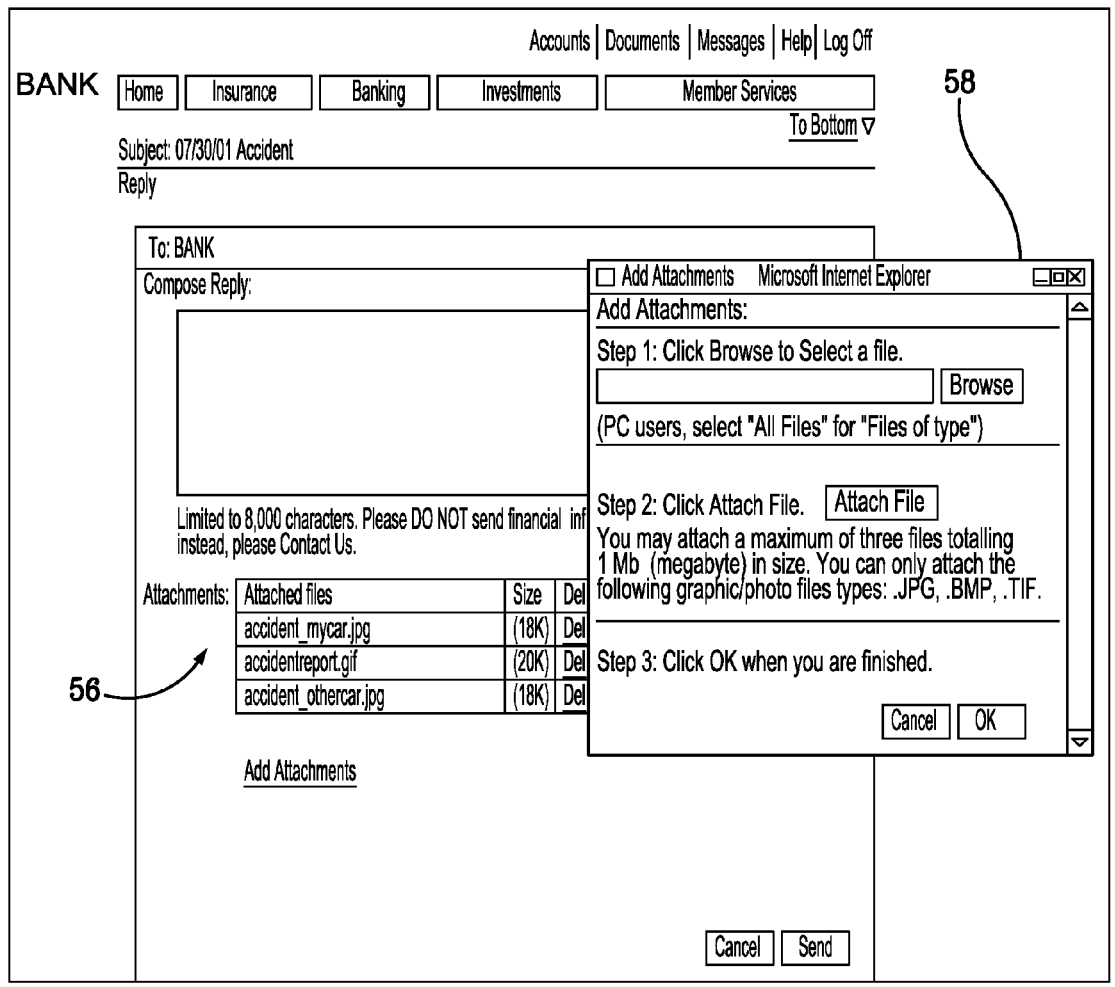

Referring to FIGS. 2, 5 and 6, once the customer has gained access to his or her inbox, he or she may view and reply to any active electronic communication thread. In addition to the message itself, the present invention provides links to other portions of the organization's website (24), as well as a message history read-out (55), for the customer's convenience. Upon clicking a reply box (54), the customer is provided with a reply screen (56) having an attachments interface (58).

The present invention allows the customer to include attachments to his or her reply email, i.e., pictures, files, etc. Once confirmed, the customer may send the reply along with any attachments to the customer service representative who initiated the communication thread, as illustrated by Boxes (36), (38), (40), (42), (44) and (46) of FIG. 2.

Figure 7:
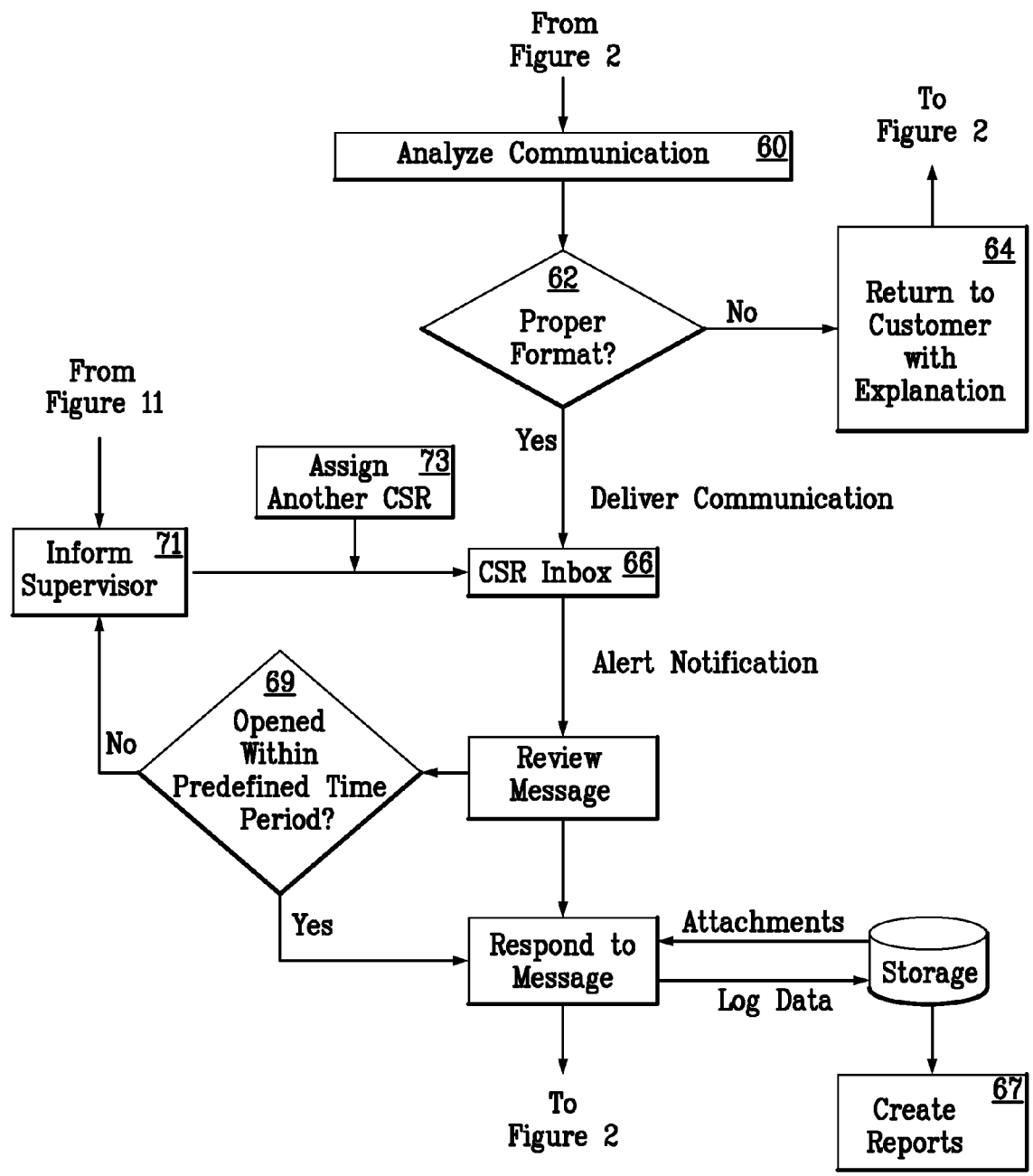
FIG. 7 is a process flow diagram illustrating the CSR receipt and response process of one embodiment of the present invention.

Referring to FIGS. 5, 7 and 8, upon transmission of a reply message by the customer, the system automatically analyzes the format of the communication, including any attachments, to ensure that the message is of a compatible format, as illustrated by Boxes (60), (62) and (64). If the message is determined to contain improperly formatted text and/or attachments, the message is returned to the customer with an accompanying explanation of the proper formatting requirements. If the communication is determined to be properly formatted, the communication is delivered to the appropriate customer service representative's inbox (66). The CSR inbox utilized in one embodiment of the present invention is illustrated by FIG. 8.

The customer service representative may review electronic communication threads and each individual message from one or more customers. As with the customer inbox (34), the CSR inbox (66) differentiates between active (66A) and inactive (66I) communication threads. In one embodiment, inactive communication threads are grayed out to prevent the customer service representative from initiating additional communication. Each communication thread held by the customer service representative's inbox may be identified according to customer number (68). This feature of the present invention allows the customer service representative to quickly access stored customer relationship management (CRM) information relating to one or more individual customers by clicking upon the customer's user number. In one embodiment, CRM information is held upon one or more storage devices (32) coupled to the electronic mail application of the present invention.

Figures 9, 10:

Referring to FIGS. 9 and 10, upon receipt of new electronic communications, the present invention provides the CSR with an alert notification. The alert notification may take the form of an audio and/or visual event designed to draw the CSR's attention. In one embodiment, alert notifications are created by a software package designed to display audio and/or visual event reminders upon the CSR interface screen. Such notification events may comprise a change in color, flashing icon, any number of audio recordings, a pop-up screen containing a reminder, or other known software driven reminder systems. In one embodiment, a host of interactive icons (70) are utilized by the system to inform and/or remind the CSR of required action. Icons utilized for this purpose, in one embodiment, are illustrated by FIG. 9. Further, an event notification (72) screen may be utilized for this purpose, as illustrated by FIG. 10.

Referring back to FIGS. 3, 7 and 11, by clicking upon a particular communication thread, the CSR may access and review each individual communication relating to that thread. Further, the customer service representative may prepare responses to one or more electronic communications contained within each active communication thread. In one embodiment, a series of document forms and/or links to additional information are made available to the customer service representative when preparing an electronic communication to the customer. For example, if the communication thread deals with a life insurance product, the present invention may provide various State approved forms for easy attachment by the customer service representative. As discussed above, this may be accomplished via a scroll-down listing of stored forms (50F) and/or links (50L) that may be accessed by simply clicking upon the desired form and/or link to be attached. In one embodiment, available forms and/or links are listed according to line of business and are stored upon a storage device coupled to the email application of the present invention. For example, if a customer service representative is qualified to deal with insurance related matters, only those forms and/or links dealing with insurance would be displayed for attachment to the representative's electronic communications.

In one embodiment, data regarding each electronic communication thread is logged to a storage device for later use. This feature of the present invention allows organization employees to access specific records and communications regarding electronic transactions. This data may also be utilized to create activity logs/reports relating to one or more communication threads, customers, or organization employees, as illustrated by Box (67) of FIG. 7.

The electronic mail application of the present invention is equipped with software driven workflow components designed to facilitate superior customer service. Referring back to FIG. 7, the present invention allows the manager to electronically activate a "reassign" function designed to assign another CSR to any given customer, or specific thread of communication, should the need arise. This feature of the present invention is particularly useful in dealing with CSR absence or inattentiveness.

In one embodiment, the manager may denote one or more time periods within which the CSR must open and/or respond to a customer communication. In one embodiment, the default time period for opening and responding to a customer communication is 24 hours. Thus, if the CSR fails to comply with the predefined time period(s), the customer may be transferred to another qualified CSR, as illustrated by Boxes (69), (71), and (73) of FIG. 7 and Box (80) of FIG. 11.

Figure 11:
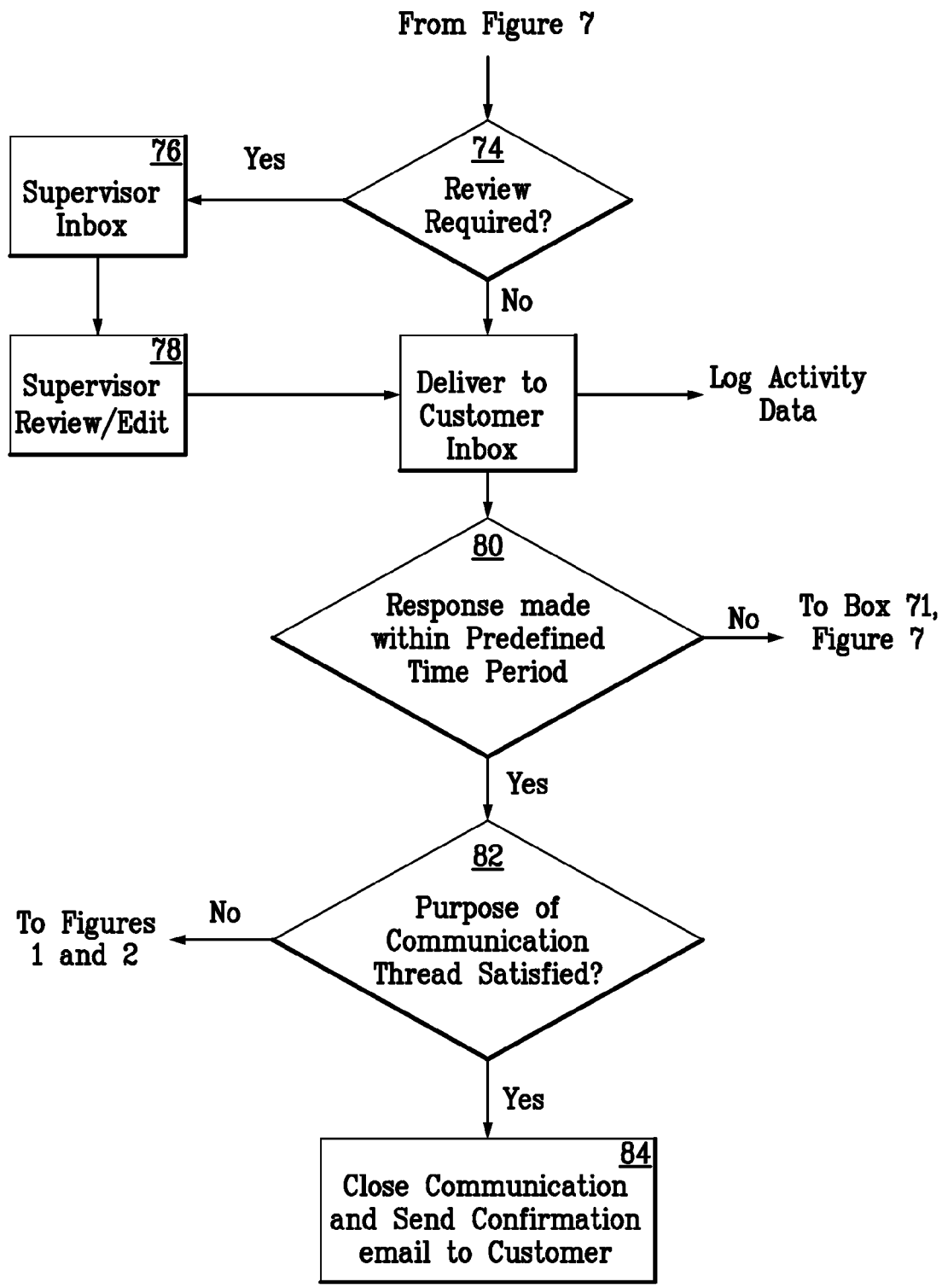
FIG. 11 is a process flow diagram illustrating the administrative functionality of one embodiment of the present invention.

The present invention allows the manager to specify whether CSR responses will be subject to automatic preview and/or manager review prior to transmission to the customer, as illustrated by Boxes (74), (76), and (78) of FIG. 11. If supervisor review is desirable, the electronic communication is provided to the supervisor so that he or she may review and/or edit proposed correspondence. The proposed communication may be returned to the CSR for changes and/or explanation, or sent directly to the customer from the supervisor upon the required changes being made. As described above, once the purpose of any given communication thread has been satisfied, the communication thread is closed by the CSR, as illustrated by Boxes (82) and (84) of FIG. 11.

The present invention provides a series of attractive administrative screens (86) through which managerial personnel may access the electronic mail application. In one embodiment, the present invention provides a reassignment screen (88), as illustrated by FIG. 12. In addition to reassigning a customer to another CSR, the manager may simply "takeover" the communication thread such that the manager is now be responsible for providing services to the customer via electronic communication. In one embodiment, reassignment and takeover links (90 and 92, respectively) are provided upon the administrative inbox (94), as illustrated by FIG. 13. In one embodiment, the administrative inbox is equipped with active/inactive thread functionality (86A and 86I, respectively), as described above.

Referring to FIGS. 14-16, in one embodiment, a manager settings screen (96) is provided through which high level managers may assign other managers to oversee one or more CSRs and/or groups of CSRs. Further, the present invention allows managers/supervisors to define the manner in which each group, or individual CSR, will interact with customers and other organization personnel. In one embodiment, this is accomplished through the use of profile and privileges interface screens (98 and 100, respectively).

In one embodiment, the manager may also set notification timers (102) for opening and/or responding to customer communications, and designate attachments to be made available to customer service representatives, given their particular line of business.

Although the invention has been described with reference to specific embodiments, this description is not meant to be construed in a limited sense. Various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention.

We claim:

1. A method of facilitating electronic communication comprising the steps of:
   providing an interactive website accessible through a global computer network; and
   providing a proprietary electronic mail application accessible through said website, said application having an electronic mail interface through which a remote user may access and respond to electronic communication(s), said electronic communication(s) being exchanged between said remote user and one or more service representatives having a relationship to said website.

2. The method of claim 1, further comprising the additional step of:
   providing a first security threshold through which said remote user must pass to gain access to said website through said computer network.

3. The method of claim 2, further comprising the additional step of providing a second security threshold through which said remote user must pass to gain access to said interface.

4. The method of claim 3, wherein all electronic communication must pass through one or more security firewalls.

5. The method of claim 4, wherein said application further comprises a representative interface through which said representative may access and respond to said remote user's electronic communication.

6. The method of claim 5, further comprising the additional step of:
   analyzing electronic communication provided by said remote user to ensure compliance with one or more desired formats.

7. The method of claim 5, wherein said representative interface provides a listing of electronic documents and/or hyperlinks available for attachment to said electronic communication.

8. The method of claim 7, wherein said documents and/or said hyperlinks are related to said representative's line of business.

9. The method of claim 8, further comprising the additional steps of:
   storing said document(s) in image type format upon a storage device; and
   extracting and attaching selected documents to said electronic communication.

10. The method of claim 5, wherein said application further comprises an access interface through which individuals having supervisory authority may 1) review and/or edit said electronic communications and/or 2) enter parameters applicable to one or more of said representatives and/or one or more threads of electronic communication.

11. The method of claim 10, wherein one of said parameters comprises the step of modifying access to electronic communication.

12. The method of claim 11, wherein one of said parameters comprises the step of reassigning one or more threads of electronic communication to another representative.

13. The method of claim 5, wherein said electronic communication is concluded by said representative after a specific topic of discussion has been resolved, said conclusion resulting in said remote user no longer having access to said electronic communication.

14. The method of claim 5, further comprising the additional steps of:

creating an electronic record of said electronic communication; and storing said record upon a storage device.

15. The method of claim 5, further comprising the additional step of:

generating an activity report relating to said electronic communication.

16. The method of claim 5, further comprising the additional step of providing notification means for informing said representative of one or more events relating to said electronic communication.

17. A method of facilitating electronic communication comprising the steps of:

providing an interactive website accessible through global computer network;

providing a proprietary electronic mail application accessible through said website, said application having an electronic mail interface through which a remote user may access and respond to electronic communication(s) from one or more service representatives having a relationship to said website;

providing a first security threshold through which said remote user must pass to gain access to said website through said computer network; and providing a second security threshold through which said remote user must pass to gain access to said interface;

wherein all electronic communication must pass through one or more security firewalls;

wherein said electronic communication is initiated by said service representative through use of an initiation message transmitted to said remote user's conventional email address, said initiation message notifying said remote user of one or more electronic communications available through said interface.

18. A system for facilitating electronic communication comprising:

a proprietary electronic mail application having at least one user interface;

a computer network connecting said electronic mail application with one or more remote users, said electronic mail application exchanging electronic communication(s) between the remote users and one or more service representatives having a relationship to said computer network; and at least one firewall positioned between said application and said remote users.

19. The system of claim 18, wherein said electronic communication is initiated by a customer service representative through use of an initiation message transmitted to said remote user's conventional email address.

20. The system of claim 18, wherein said application further comprises an access interface through which individuals having supervisory authority may 1) review and/or edit said electronic communications and/or 2) enter parameters applicable to one or more of said representatives and/or one or more threads of electronic communication.

21. The system of claim 20, wherein said electronic communication is concluded by said representative after a specific topic of discussion has been resolved, said conclusion resulting in said remote user no longer having access to said electronic communication.

22. The system of claim 18, further comprising a storage device coupled to said application.

\* \* \* \* \*